(12) United States Patent
Rohde et al.

(10) Patent No.: US 7,953,720 B1
(45) Date of Patent: May 31, 2011

(54) SELECTING THE BEST ANSWER TO A FACT QUERY FROM AMONG A SET OF POTENTIAL ANSWERS

(75) Inventors: Douglas L. T. Rohde, Pelham, NY (US); Thomas W. Ritchford, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 429 days.

(21) Appl. No.: 11/097,690

(22) Filed: Mar. 31, 2005

(51) Int. Cl.
G06F 7/00 (2006.01)
G06F 17/30 (2006.01)
(52) U.S. Cl. .......................................... 707/706
(58) Field of Classification Search ................ None
See application file for complete search history.

(56) References Cited

U.S. PATENT DOCUMENTS

| | | | |
|---|---|---|---|
| 4,888,690 A | 12/1989 | Huber | 364/200 |
| 4,899,292 A | 2/1990 | Montagna et al. | 364/521 |
| 5,475,819 A | 12/1995 | Miller et al. | 395/200.03 |
| 5,544,051 A | 8/1996 | Senn et al. | 364/419.19 |
| 5,560,005 A | 9/1996 | Hoover et al. | 395/600 |
| 5,574,898 A | 11/1996 | Leblang et al. | 395/601 |
| 5,778,378 A | 7/1998 | Rubin | 707/103 |
| 5,815,415 A | 9/1998 | Bentley et al. | 364/578 |
| 5,832,479 A | 11/1998 | Berkowitz et al. | 707/3 |
| 5,870,739 A | 2/1999 | Davis, III et al. | 707/4 |
| 5,905,980 A | 5/1999 | Masuichi et al. | 707/1 |
| 5,946,692 A | 8/1999 | Faloutsos et al. | 707/101 |
| 5,963,940 A | 10/1999 | Liddy et al. | 707/5 |
| 6,006,221 A | 12/1999 | Liddy et al. | 707/5 |
| 6,014,661 A | 1/2000 | Ahlberg et al. | 707/3 |
| 6,026,388 A | 2/2000 | Liddy et al. | 707/1 |
| 6,029,195 A | 2/2000 | Herz | 709/219 |
| 6,101,515 A | 8/2000 | Wical et al. | 707/531 |
| 6,105,020 A | 8/2000 | Lindsay et al. | 707/2 |
| 6,105,030 A | 8/2000 | Syed et al. | 707/10 |
| 6,216,138 B1 | 4/2001 | Wells et al. | 707/502 |
| 6,222,540 B1 | 4/2001 | Sacerdoti | 345/339 |
| 6,263,328 B1 | 7/2001 | Coden et al. | 707/3 |
| 6,263,335 B1 | 7/2001 | Paik et al. | 707/5 |
| 6,304,864 B1 | 10/2001 | Liddy et al. | 706/15 |
| 6,311,189 B1 | 10/2001 | deVries et al. | 707/102 |
| 6,326,962 B1 | 12/2001 | Szabo | 345/348 |
| 6,327,574 B1 | 12/2001 | Kramer et al. | 705/14 |

(Continued)

FOREIGN PATENT DOCUMENTS

DE 10245900 A1 4/2004

(Continued)

OTHER PUBLICATIONS

Ilyas et al., "Rank-aware query optimization", Proceedings of the 2004 ACM SIGMOD international conference on Management of data, pp. 203-214, ACM 2004.*

(Continued)

*Primary Examiner* — Michael J Hicks
(74) *Attorney, Agent, or Firm* — Morgan, Lewis & Bockius LLP

(57) ABSTRACT

A method and system for selecting a best answer to a factual query. Possible answers to a factual query are identified. The possible answers are scored and the best scoring possible answers are compared to other possible answers to determine how well they are supported. The most supported answer is chosen to be presented to the user.

36 Claims, 10 Drawing Sheets

U.S. PATENT DOCUMENTS

| | | | |
|---|---|---|---|
| 6,363,179 B1 | 3/2002 | Evans et al. ............... | 382/309 |
| 6,377,943 B1 | 4/2002 | Jakobsson .................. | 707/2 |
| 6,480,194 B1 | 11/2002 | Sang'udi et al. ............ | 345/440 |
| 6,519,631 B1 | 2/2003 | Rosenschein et al. ........ | 709/217 |
| 6,529,900 B1 | 3/2003 | Patterson et al. ........... | 707/3 |
| 6,584,464 B1 | 6/2003 | Warthen .................... | 707/4 |
| 6,606,659 B1 | 8/2003 | Hegli et al. ................ | 709/225 |
| 6,609,123 B1 | 8/2003 | Cazemier et al. ............ | 707/4 |
| 6,629,097 B1 | 9/2003 | Keith ......................... | 707/5 |
| 6,643,641 B1 | 11/2003 | Snyder ....................... | 707/4 |
| 6,718,324 B2 | 4/2004 | Edlund et al. ............... | 707/5 |
| 6,832,218 B1* | 12/2004 | Emens et al. ............... | 707/3 |
| 6,850,896 B1 | 2/2005 | Kelman et al. .............. | 705/10 |
| 6,873,982 B1* | 3/2005 | Bates et al. ................. | 707/5 |
| 6,885,990 B1 | 4/2005 | Ohmori et al. .............. | 704/270 |
| 6,928,436 B2 | 8/2005 | Baudel ....................... | 707/6 |
| 6,961,723 B2 | 11/2005 | Faybishenko et al. ........ | 707/3 |
| 6,968,343 B2 | 11/2005 | Charisius et al. ........... | 707/102 |
| 7,013,308 B1 | 3/2006 | Tunstall-Pedoe ............ | 707/104.1 |
| 7,031,955 B1 | 4/2006 | de Souza et al. ............ | 707/3 |
| 7,043,521 B2 | 5/2006 | Eitel ........................... | 709/202 |
| 7,100,083 B2 | 8/2006 | Little et al. .................. | 714/26 |
| 7,146,538 B2 | 12/2006 | Johnson et al. .............. | 714/30 |
| 7,158,983 B2 | 1/2007 | Willse et al. ................. | 707/101 |
| 7,669,115 B2 | 2/2010 | Cho et al. .................... | 715/212 |
| 2002/0055954 A1 | 5/2002 | Breuer ........................ | 707/507 |
| 2002/0065814 A1 | 5/2002 | Okamoto et al. ............ | 707/3 |
| 2002/0065815 A1 | 5/2002 | Layden ....................... | 707/3 |
| 2002/0128818 A1 | 9/2002 | Ho et al. ..................... | 704/9 |
| 2002/0154175 A1 | 10/2002 | Abello et al. ................ | 345/853 |
| 2002/0173984 A1 | 11/2002 | Robertson et al. ........... | 705/1 |
| 2003/0005036 A1 | 1/2003 | Mitzenmacher .............. | 709/203 |
| 2003/0069880 A1 | 4/2003 | Harrison et al. .............. | 707/3 |
| 2003/0097357 A1 | 5/2003 | Ferrari et al. ................. | 707/3 |
| 2003/0115485 A1 | 6/2003 | Milliken ..................... | 713/201 |
| 2003/0120373 A1 | 6/2003 | Eames ........................ | 700/128 |
| 2003/0120644 A1 | 6/2003 | Shirota ....................... | 707/3 |
| 2003/0120654 A1 | 6/2003 | Edlund et al. ............... | 707/7 |
| 2003/0120659 A1 | 6/2003 | Sridhar ....................... | 707/100 |
| 2003/0154071 A1 | 8/2003 | Shreve ........................ | 704/9 |
| 2003/0158855 A1 | 8/2003 | Farnham et al. ............. | 707/102 |
| 2003/0195872 A1* | 10/2003 | Senn ........................... | 707/3 |
| 2003/0208665 A1 | 11/2003 | Peir et al. .................... | 711/169 |
| 2003/0217052 A1 | 11/2003 | Rubenczyk et al. .......... | 707/3 |
| 2004/0030731 A1 | 2/2004 | Iftode et al. ................. | 707/205 |
| 2004/0107125 A1 | 6/2004 | Guheen et al. .............. | 705/7 |
| 2004/0122844 A1 | 6/2004 | Malloy et al. ............... | 707/102 |
| 2004/0125137 A1 | 7/2004 | Stata et al. .................. | 345/764 |
| 2004/0167909 A1 | 8/2004 | Wakefield et al. ........... | 707/100 |
| 2004/0220904 A1 | 11/2004 | Finlay et al. ................. | 707/3 |
| 2004/0236655 A1 | 11/2004 | Scumniotales et al. ....... | 705/36 |
| 2004/0255237 A1 | 12/2004 | Tong .......................... | 715/501.1 |
| 2004/0267700 A1 | 12/2004 | Dumais et al. ............... | 707/2 |
| 2005/0022009 A1 | 1/2005 | Aguilera et al. ............. | 713/201 |
| 2005/0033803 A1 | 2/2005 | Vleet et al. .................. | 709/203 |
| 2005/0039033 A1 | 2/2005 | Meyers et al. ............... | 713/193 |
| 2005/0050016 A1 | 3/2005 | Stanoi et al. ................ | 707/3 |
| 2005/0055327 A1 | 3/2005 | Agrawal et al. .............. | 707/1 |
| 2005/0057566 A1 | 3/2005 | Githens et al. ............... | 345/440 |
| 2005/0060277 A1 | 3/2005 | Zlatanov et al. ............. | 707/1 |
| 2005/0076012 A1 | 4/2005 | Manber et al. ............... | 707/3 |
| 2005/0083413 A1 | 4/2005 | Reed et al. .................. | 348/211.99 |
| 2005/0086520 A1 | 4/2005 | Dharmapurikar et al. .... | 713/201 |
| 2005/0120004 A1 | 6/2005 | Stata et al. .................. | 707/3 |
| 2005/0187898 A1 | 8/2005 | Chazelle et al. .............. | 707/1 |
| 2005/0216464 A1 | 9/2005 | Toyama et al. ............... | 707/9 |
| 2005/0219929 A1 | 10/2005 | Navas ........................ | 365/212 |
| 2005/0256825 A1 | 11/2005 | Dettinger et al. ............. | 707/1 |
| 2005/0268212 A1 | 12/2005 | Dagel ......................... | 715/500 |
| 2006/0004851 A1 | 1/2006 | Gold et al. ................... | 707/103 X |
| 2006/0020582 A1 | 1/2006 | Dettinger et al. ............. | 707/3 |
| 2006/0047838 A1 | 3/2006 | Chauhan ..................... | 709/230 |
| 2006/0085386 A1 | 4/2006 | Thanu et al. ................. | 707/2 |
| 2006/0085465 A1 | 4/2006 | Nori et al. ................... | 707/101 |
| 2006/0149700 A1 | 7/2006 | Gladish et al. ............... | 707/1 |
| 2006/0173824 A1 | 8/2006 | Bensky et al. ............... | 707/3 |
| 2006/0206508 A1 | 9/2006 | Colace et al. ................ | 707/100 |
| 2006/0224582 A1 | 10/2006 | Hogue ........................ | 707/6 |
| 2006/0253491 A1 | 11/2006 | Gokturk et al. .............. | 707/104.1 |
| 2007/0022085 A1 | 1/2007 | Kulkarni ..................... | 707/1 |
| 2007/0055656 A1 | 3/2007 | Tunstall-Pedoe ............ | 707/3 |
| 2007/0067108 A1 | 3/2007 | Buhler et al. ................ | 702/19 |
| 2007/0179965 A1 | 8/2007 | Hogue et al. ................ | 707/102 |
| 2007/0203867 A1 | 8/2007 | Hogue et al. ................ | 706/48 |
| 2007/0203868 A1 | 8/2007 | Betz ........................... | 706/50 |
| 2007/0271249 A1 | 11/2007 | Cragun et al. ............... | 707/3 |
| 2008/0005064 A1 | 1/2008 | Sarukkai ..................... | 707/3 |
| 2008/0097958 A1 | 4/2008 | Ntoulas et al. ............... | 707/2 |
| 2008/0209444 A1 | 8/2008 | Garrett et al. ............... | 719/320 |
| 2008/0267504 A1 | 10/2008 | Schloter et al. .............. | 382/181 |
| 2009/0100048 A1 | 4/2009 | Hull et al. ................... | 707/5 |

FOREIGN PATENT DOCUMENTS

| | | |
|---|---|---|
| WO | WO 00/49526 A1 | 8/2000 |
| WO | WO 2004/114163 A2 | 12/2004 |
| WO | WO 2008/097051 A1 | 8/2008 |

OTHER PUBLICATIONS

Lin et al., "Question Answering from the Web Using Knowledge Annotation and Knowledge Mining Techniques", CIKM'03, pp. 116-123, Nov. 2003, ACM.*

Nyberg et al., "The Javelin Question-Answering System at TREC 2003: A Multi Strategy Approach with Dynamic Planning", Proceedings of Text Retrieval Conference (TREC 2003), Nov. 18-21, 2003.*

Bharat, *Personalized, Interactive News on the Web*, Georgia Institute of Technology, Atlanta, GA, May 5, 1997, pp. 1-22.

*Bloom filter*, Wikipedia, en.wikipedia.org/wiki/Bloom_filter (last modified Feb. 13, 2005).

Bloom, *Space/Time Trade-offs in Hash Coding with Allowable Errors*, Communications of the ACM, vol. 13, No. 7, Jul. 1970, pp. 422-426.

Brill, *An Analysis of the AskMSR Question Answering System*, Proceedings of the Conference of Empirical Methods in Natural Language Processing (EMNLP), Jul. 2002, 8 pages.

Brin, *Extracting Patterns and Relations from the World Wide Web*, Computer Science Department, Stanford University, 1999, 12 pages.

Brin, *The Anatomy of a Large-Scale Hypertextual Web Search Engine*, 7th International World Wide Web Conference, Brisbane, Australia, Apr. 14-18, 1998, pp. 1-26.

Cao, *Bloom Filters—the math*, www.cs.wisc.edu/~cao/papers/summary-cache/node8.html, Jul. 5, 1998, pp. 1-6.

Chang, *IEPAD: Information Extraction Based on Pattern Discovery*, WWW10 '01, ACM, Hong Kong, May 1-5, 2001, pp. 681-688.

Chesnais, *The Fishwrap Personalized News System*, Community Networking, Integrated Multimedia Services to the Home, Proceedings of the Second International Workshop on, Jun. 20-22, 1995, pp. 275-282.

Chu-Carroll, *A Multi-Strategy with Multi-Source Approach to Question Answering*, IBM T.J. Watson Research Center, Yorktown Heights, NY, 2006, 8 pages.

Clarke, *FrontPage 2002 Tutorials—Adding Functionality to your Website with FrontPage 2002 Part II—Navigation*, ABC—A11 'Bout Computers, Apr. 2002, vol. 11, accessfp.net/fronpagenavigation.htm, 8 pages.

Cowie, *MOQA: Meaning-Oriented Question Answering*, Proceedings of RIAO 2004, 15 pages.

Dean, *MapReduce: Simplified Data Processing on Large Clusters*, OSDI, 2004, pp. 1-13.

Etzioni, *Web-scale Information Extraction in KnowItAll (Preliminary Results)*, WWW2004, ACM, New York, NY, May 17-20, 2004, 11 pages.

Freitag, *Boosted Wrapper Induction*, American Association for Artificial Intelligence, 2000, 7 pages.

Guha, *Disambiguating People in Search*, WWW2004, New York, NY, May 17-22, 2004, 9 pages.

Guha, *Object Co-Identification on the Semantic Web*, WWW2004, ACM, New York, NY, May 17-22, 2004, 9 pages.

Hogue, *Tree Pattern Inference and Matching for Wrapper Induction on the World Wide Web*, Master of Engineering in Electrical Engineering and Computer Science, Massachusetts Institute of Technology, Jun. 2004, pp. 1-106.

*Information Entropy*—Wikipedia, the free encyclopedia, retrieved on May 3, 2006, pp. 1-9.
*Information Theory*—Wikipedia, the free encyclopedia, retrieved on May 3, 2006, pp. 1-12.
International Search Report/Written Opinion, PCT/US06/07639, Sep. 13, 2006, 5 pages.
International Search Report/Written Opinion, PCT/US07/061157, Feb. 15, 2008, 10 pages.
International Search Report/Written Opinion, PCT/US07/61156, Feb. 11, 2008, 5 pages.
International Search Report/Written Opinion, PCT/US2006/010965, Jul. 5, 2006, 9 pages.
International Search Report/Written Opinion, PCT/US2007/061158, Feb. 28, 2008, 7 pages.
Jones, *Bootstrapping for Text Learning Tasks*, Carnegie Mellon University, Pittsburgh, PA, 1999, 12 pages.
Kamba, *The Krakatoa Chronicle, An interactive, Personalized, Newspaper on the Web*, w3.ord/conferences/www4/papers/93, 1993, pp. 1-12.
Kosseim, *Answer Formulation for Question-Answering*, Concordia University, Montreal, Quebec, Canada, Oct. 1, 2007, 11 pages.
Liu, *Mining Data Records in Web Pages*, Conference '00, ACM 2000, pp. 1-10.
McCallum, *Object Consolidation by Graph Partitioning with a Conditionally-Trained Distance Metric*, SIGKDD 03, Washington, DC, Aug. 24-27, 2003, 6 pages.
Mihalcea, *PageRank on Semantic Networks, with Application to Word Sense Disambiguation*, Proceedings of the 20th International Conference on Computational Linguistics, Aug. 23-27, 2004, 7 pages.
Mihalcea, *TextRank: Bringing Order into Texts*, Proceedings of the Conference on Empirical Methods in Natural Language Processing, Jul. 2004, 8 pages.
Ogden, *Improving Cross-Language Text Retrieval with Human Interactions*, Proc. of the 33rd Hawaii International Conference on System Sciences, IEEE 2000, pp. 1-9.
Prager, *IBM's Piquant in TREC2003*, Nov. 18-21, 2003, 10 pages.
Prager, *Question Answering Using Constraint Satisfaction: QA-by Dossier with Constraints*, 2004, 8 pages.
Ramakrishnan, *Is Question Answering an Acquired Skill?*, WWW2004, New York, NY, May 17, 2004, pp. 111-120.
*The Math Works, Using Matlab Graphics*, Version 5, MathWorks, Natick, MA, Dec. 1996.
Thompson, *Freshman Publishing Experiment Offers Made-to-Order Newspapers*, MIT News Office, http://web.mit.edu/newsoffice/1994/newspaper-0309.html, 1994, pp. 1-4.
Anagnostopoulos, *Information Fusion Meta-Search Interface for Precise Photo Acquisition on the Web*, 25th International Conference on Information Technology Interfaces, ITI 2003, Jun. 16-19, 2003, Cavtat, Croatia, pp. 375-381.
Anonymous, *Wie erstelle ich bei StudiVZ eine Bilder-Verlinkung? (How do I create an image with StudiVZ-linking?)*, www.limillimil.de/wie-erstelle-ich-bei-studivz-eine-bilder-verlinkung-758.html, 2008, 10 pages.
Castro, *iPhoto's new Faces feature really does work!*, www.pigsgourdandwikis.com/2009/02/iphotos-new-faces-geature-really-does.html, Feb. 17, 2009, 8 pages.
International Search Report/Written Opinion, PCT/US2010/044603, Nov. 17, 2010, 11 pages.
International Search Report/Written Opinion, PCT/US2010/044604, Oct. 6, 2010, 10 pages.

* cited by examiner

SELECTING THE BEST ANSWER TO A FACT QUERY FROM AMONG A SET OF POTENTIAL ANSWERS

RELATED APPLICATIONS

This application is related to the following applications, each of which is hereby incorporated by reference:

U.S. patent application Ser. No. 11/097,688, "Corroborating Facts Extracted from Multiple Sources," filed on Mar. 31, 2005;

U.S. patent application Ser. No. 11/097,676, "Bloom Filters for Query Simulation," filed on Mar. 31, 2005;

U.S. patent application Ser. No. 11/097,689, "User Interface for Facts Query Engine with Snippets from Information Sources that Include Query Terms and Answer Terms," filed on Mar. 31, 2005; and U.S. patent application Ser. No. 11/024,784, "Supplementing Search Results with Information of Interest," filed on Dec. 30, 2004.

TECHNICAL FIELD

The disclosed embodiments relate generally to queries for facts, and more particularly, to selection of a best answer to a factual query.

BACKGROUND

The World Wide Web (also known as the "Web") and the web pages within the Web are a vast source of factual information. Users may look to web pages to get answers to factual questions, such as "what is the capital of Poland" or "what is the birth date of George Washington." Web search engines, however, may be unhelpful to users in this regard, as they generally do not provide a simple, succinct answer to factual queries such as the ones described above. Rather, Web search engines provide a list of Web pages that are determined to match the query to the user, and the user has to sort through the matching Web pages to find the answer.

Attempts that have been made to build search engines that can provide quick answers to factual questions have their own shortcomings. For example, some search engines draw their facts from a single source, such as a particular encyclopedia. This limits the types of questions that these engines can answer. For instance, a search engine based on an encyclopedia is unlikely to be able to answer many questions concerning popular culture, such as questions about movies, songs or the like, and is also unlikely to be able to answer many questions about products, services, retail and wholesale businesses and so on. If the set of sources used by such a search engine were to be expanded, however, such expansion might introduce the possibility of multiple possible answers to a factual query, some of which might be contradictory or ambiguous. Furthermore, as the universe of sources expands, information may be drawn from untrustworthy sources or sources of unknown reliability.

SUMMARY

According to an aspect of the invention, a method for selecting an answer to a factual query includes receiving a factual query; searching a fact repository to identify one or more possible answers to the factual query; determining for at least a subset of the possible answers a respective score; identifying a first answer of the possible answers with a best score; and generating a response including the first answer if the best score satisfies a first condition and satisfies a second condition with respect to the score of a second answer of the possible answers.

According to another aspect of the invention, a method for selecting an answer to a factual query includes receiving a factual query; identifying one or more possible answers to the factual query; determining for each of the possible answers a respective score; identifying first answers of the possible answers with best scores; for each of the first answers, identifying second answers of the possible answers that support the respective first answer and determining a supported score based on the score of the respective first answer and the scores of the second answers; identifying a third answer of the first answers with a best supported score; and generating a response including the third answer if the best supported score satisfies a first condition.

BRIEF DESCRIPTION OF THE DRAWINGS

Like reference numerals refer to corresponding parts throughout the drawings.

DESCRIPTION OF EMBODIMENTS

A query engine can store factual information gathered from many disparate sources and return answers in response to queries for factual information (or "factual queries") from a user. Gathering information from many sources expands the scope of available factual information for the query engine, but also introduces the possibility of multiple possible answers. The query engine may identify possible answers and select a best answer from the possible answers to present to the user, or it may determine that none of the possible answers are presentable to the user. The query engine may also provide a list of sources of the answer, including portions of text from each source. The portion or portions of text is called a snippet and may include terms of the factual query and terms of the answer. While a snippet shows the answer identified or selected by the search engine, the list of sources provide the user with the basis for the answer and may aid the user in evaluating the veracity of the answer.

Figure 1:
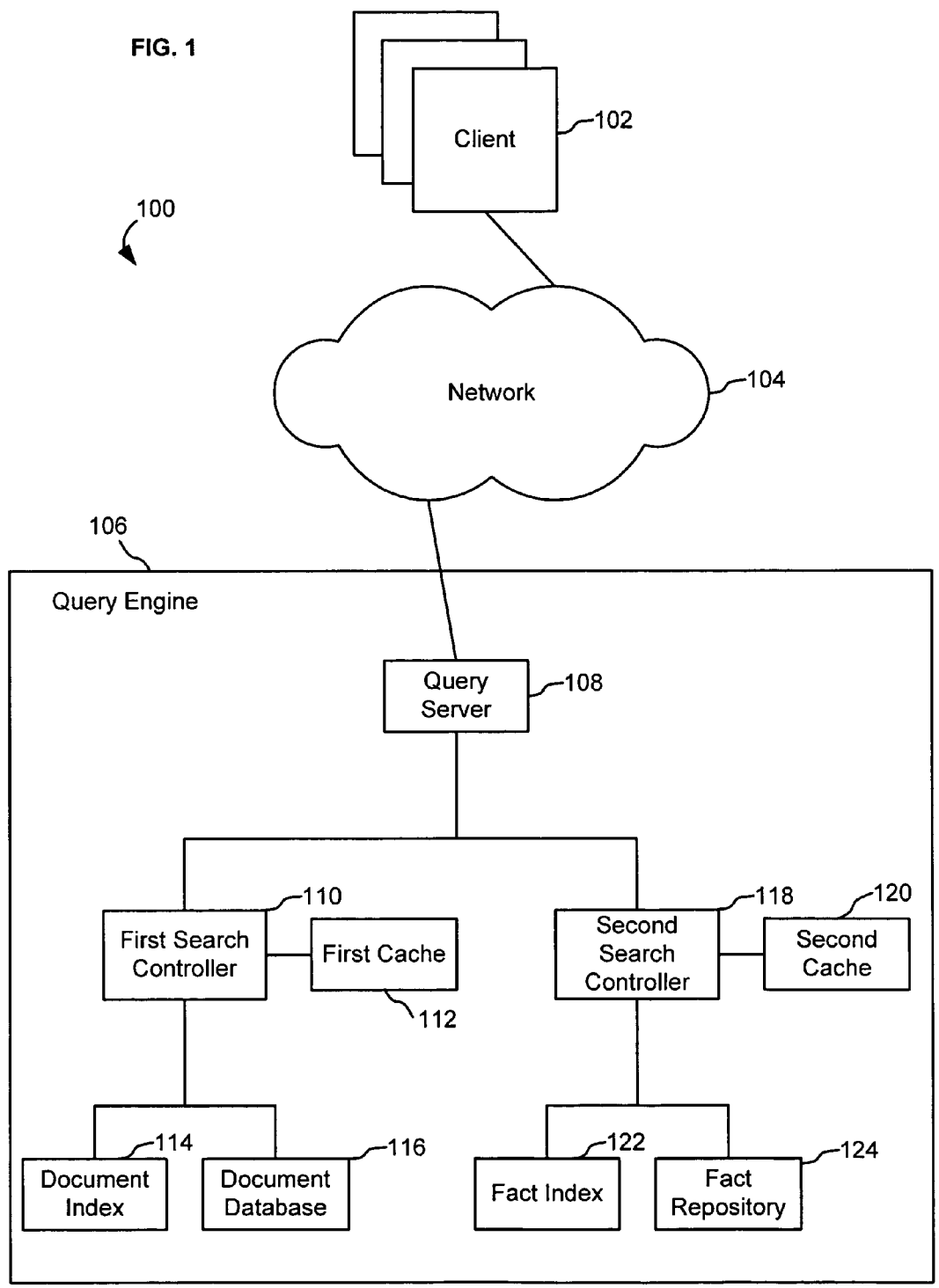
FIG. 1 illustrates a network, according to some embodiments of the invention.

FIG. 1 illustrates a network 100, according to some embodiments of the invention. Network 100 includes a one or more clients 102 and a query engine 106. A client 102 may include a client application (not shown). The network 100 also includes one or more communication networks 104 that couple these components.

The client application provides a user (not shown) of client 102 an interface to the query engine 106. Using a client application that runs on client 102, the user can submit searches for documents (for example, Web searches) and factual queries to the query engine 106 and view responses from the query engine 106. The client application may include web browsers. Examples of web browsers include FIREFOX, INTERNET EXPLORER, and OPERA.

The query engine 106 provides a platform for storing factual information and responding to factual queries, as well as handling other types of searches. The query engine 106 can handle searches for documents, such as Web searches, and queries for factual information. The query engine 106 includes a query server 108. The query server 108 provides a front-end to the query engine 106. The query server 108 receives queries from the client 102, directs queries to components of the query engine 106 that handle factual queries and other searches, generates responses, and transmits responses to the client 102. The query server 108 may be distributed over multiple computers. In other embodiments, more or fewer functions may be handled by the query engine. For instance, in other embodiments response generation may be handled elsewhere in the query engine 106.

The query engine 106 includes a first search controller 110, a first cache 112, a document index 114, and a document database 116 for handling document searches. In some embodiments, these components may be deployed over multiple computers in order to provide fast access to a large number of documents. For example, the document database 116 may be deployed over N servers, with a mapping function such as the "modulo N" function being used to determine which documents are stored in each of the N servers. N may be an integer greater than 1, for instance an integer between 2 and 8196. Similarly, the document index 114 may be distributed over multiple servers, and the first cache 112 may also be distributed over multiple servers. Furthermore, the first search controller 110 may also be distributed over multiple computers.

The first search controller 110 is coupled to the query server 108. The first search controller 110 is also coupled to the first cache 112, the document index 114 and the document database 116. The first search controller 110 may be configured to receive document search queries from the query server 108 and transmit the queries to the first cache 112, the document index 114, and the document database 116. The first cache 112 may be used to increase search efficiency by temporarily storing previously located search results.

The first search controller 110 receives the document search results from the first cache 112 and/or the document index 114 and constructs an ordered search result list. The first search controller 110 then returns a list of located documents back to the query server 108 for onward transmittal to the client 102. The document search results received by the first search controller 110 from the first cache 112 and/or the document index 114 may be accompanied by snippets of the located documents in the search results.

The query engine 106 also includes a second search controller 118, a second cache 120, a fact index 122, and a fact repository 124. In some embodiments, these components may be deployed over multiple computers in order to provider faster access to a large number of facts. For example, the fact repository 124 may be deployed over N servers, with a mapping function such as the "modulo N" function being used to determine which facts are stored in each of the N servers. N may be an integer greater than 1, for instance an integer between 2 and 8196. Similarly, the fact index 122 may be distributed over multiple servers, and the second cache 120 may also be distributed over multiple servers. Furthermore, the second search controller 118 may also be distributed over multiple computers.

The second search controller 118 is coupled to the query server 108. The second search controller 118 is also coupled to the second cache 120, the fact index 122 and the fact repository 124. The second search controller 118 may be configured to receive queries for answers to factual questions from the query server 108 and transmit the queries to the second cache 120 and to the fact repository 124 (via the fact index 122). The second cache 120 may be used to increase fact retrieval efficiency by temporarily storing previously located search results.

The second search controller 118 receives facts that are possible answers to a factual query from the second cache 120 and/or the fact repository 124. The second search controller 118 selects an answer from the possible answers as the best answer to present to the user. That answer is transmitted to the query server 108, where a response including that answer is generated and transmitted to the client 102 for presentation to the user. In response to user selection of an icon displayed at or next to an answer to a factual query, the query server 108 may identify a list of sources associated with the answer and transmit the list of sources to the first search controller 110. The first search controller 110 accesses documents that correspond to the sources and obtains snippets for at least a subset of the source documents from the document database 116. In some embodiments, the snippets include terms from the query and terms from the answer.

The fact repository 124 stores factual information extracted from a plurality of documents. A document from which a particular fact may be extracted is a source document (or "source") of that fact. In other words, a source of a fact includes that fact within its contents. Sources documents may include, without limitation, Web pages. Within the fact repository 124, entities, concepts, and the like for which the fact repository 124 may have factual information stored are represented by objects. An object may have one or more facts associated with it. Each object is a collection of facts; an object that has no facts associated with it (an empty object) may be viewed as a non-existent object within the fact repository 124. Within each object, each fact associated with the object is stored as an attribute-value pair. Each fact also includes a list of source documents that include the fact within their contents and from which the fact was extracted. Further details about objects and facts in the fact repository are described below, in relation to FIG. 2.

To lookup information in the fact repository 124, the second search controller 118 searches the fact index 122 for the terms in the search query or a query derived from a processing of the search query. This results in lists of fact repository locations (i.e., which correspond to facts or objects) that match the various terms in the search query. Using the logical structure of the search query (which may be considered to be a Boolean expression or tree), the second search controller 118 then forms logical combinations of these location lists to identify possible facts, if any, that match the search query.

The fact index 122 provides one or more indexes to the fact repository 124 and facilitates efficient lookup of information in the fact repository 124. The fact index 122 may include one or more indexes, each index indexing the fact repository 124 based on one or more parameters. For example, the fact index 122 may have a first index (which may be called a main index or term index) that indexes unique terms to locations within the fact repository 124. Another index that may optionally be included in the fact index 122 is an attribute index that maps attribute terms to locations within the fact repository 124. Yet another index that may optionally be included in the fact index is an object name index that maps object name terms to objects in the fact repository 124. Further details about the fact index 122 are described below, in relation to FIG. 3.

It should be appreciated that while any of the components of the query engine 106 may be distributed over multiple computers, for convenience of explanation, we will discuss the components of the query engine 106 as though they were implemented on a single computer.

Figure 2:
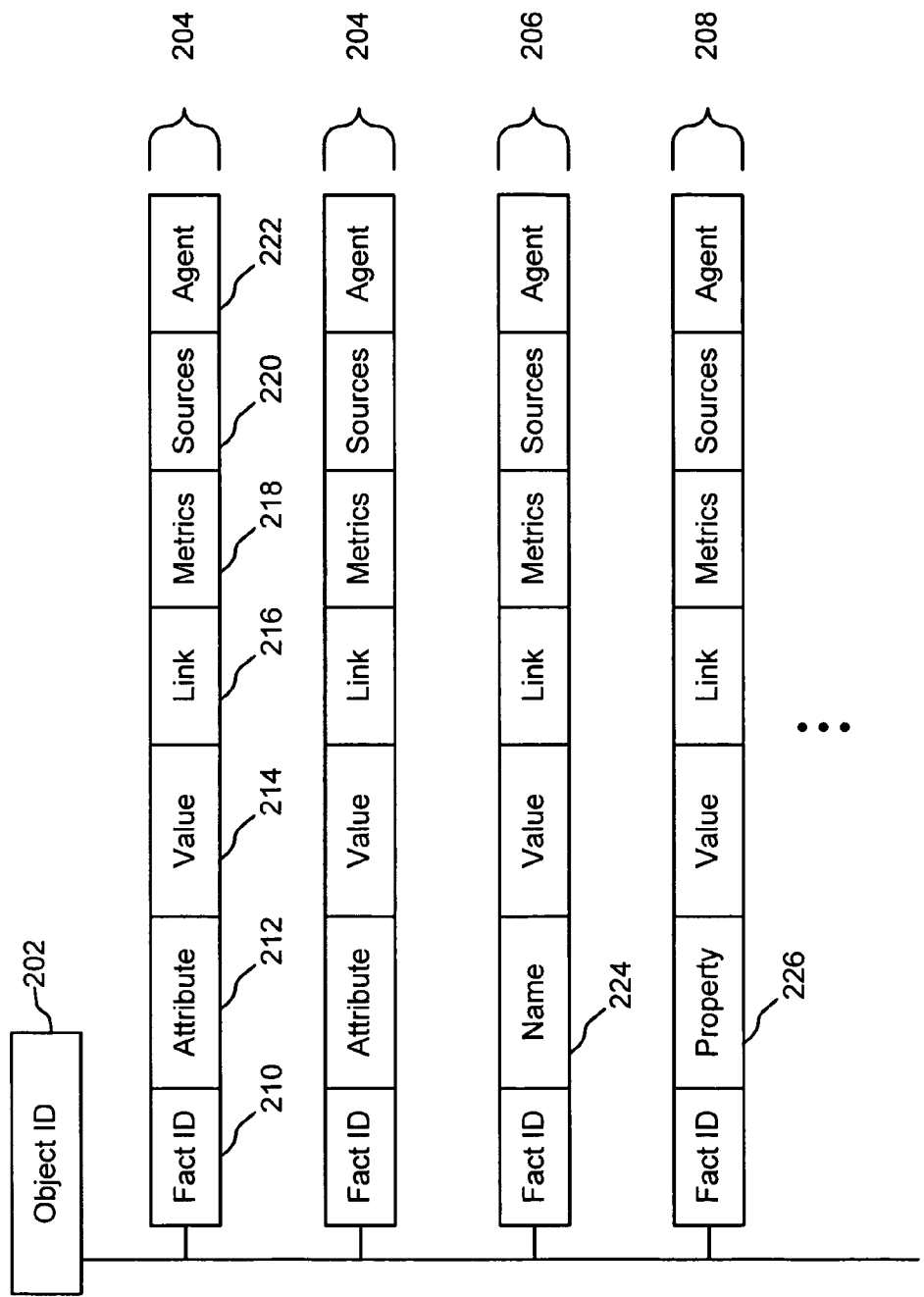
FIG. 2 illustrates a data structure for an object and associated facts in a fact repository, according to some embodiments of the invention.

FIG. 2 illustrates an exemplary data structure for an object within the fact repository 124, according to some embodiments of the invention. As described above, the fact repository includes objects, each of which may include one or more facts. Each object 200 includes a unique identifier, such as the object ID 202. The object 200 includes one or more facts 204. Each fact 204 includes a unique identifier for that fact, such as a Fact ID 210. Each fact 204 includes an attribute 212 and a value 214. For example, facts included in an object representing George Washington, may include facts having attributes of "date of birth" and "date of death," and the values of these facts would be the actual date of birth and date of death, respectively. A fact 204 may include a link 216 to another object, which is the object identifier, such as the object ID 202 of another object within the fact repository 124. The link 216 allows objects to have facts whose values are other objects. For example, for an object "United States," there may be a fact with the attribute "president" whose value is "George W. Bush," with "George W. Bush" being another object in the fact repository 124. In some embodiments, the value field 214 stores the name of the linked object and the link 216 stores the object identifier of the linked object.

Each fact 204 also may include one or more metrics 218. The metrics may provide indications of the quality of the fact. In some embodiments, the metrics include a confidence level and an importance level. The confidence level indicates the likelihood that the fact is correct. The importance level indicates the relevance of the fact to the object, compared to other facts for the same object. In other words, the importance level measures how vital a fact is to an understanding of the entity or concept represented by the object.

Each fact 204 includes a list of sources 220 that include the fact and from which the fact was extracted. Each source may be identified by a Uniform Resource Locator (URL), or Web address.

In some embodiments, some facts may include an agent field 222 that identifies the module that extracted the fact. For example, the agent may be a specialized module that extracts facts from a specific source, or a module that extracts facts from free text in documents throughout the Web, and so forth.

In some embodiments, an object 200 may have one or more specialized facts, such as a name fact 206 and a property fact 208. A name fact 206 is a fact that conveys a name for the entity or concept represented by the object 200. For example, for an object representing the country Spain, there may be a fact conveying the name of the object as "Spain." A name fact 206, being a special instance of a general fact 204, includes the same parameters as any other fact 204; it has an attribute, a value, a fact ID, metrics, sources, etc. The attribute 224 of a name fact 206 indicates that the fact is a name fact, and the value is the actual name. The name may be a string of text. An object 200 may have one or more name facts, as many entities or concepts can have more than one name. For example, an object representing Spain may have name facts conveying the country's common name "Spain" and the official name "Kingdom of Spain." As another example, an object representing the U.S. Patent and Trademark Office may have name facts conveying the agency's acronyms "PTO" and "USPTO" and the official name "United States Patent and Trademark Office."

A property fact 208 is a fact that conveys a statement about the entity or concept represented by the object 200 that may be of interest. For example, for the object representing Spain, a property fact may convey that Spain is a country in Europe. A property fact 208, being a special instance of a general fact 204, also includes the same parameters (such as attribute, value, fact ID, etc.) as other facts 204. The attribute field 226 of a property fact 208 indicates that the fact is a property fact, and the value field is a string of text that conveys the statement of interest. For example, for the object representing Spain, the value of a property fact may be the text string "is a country in Europe." An object 200 may have zero or more property facts.

It should be appreciated that the data structure illustrated in FIG. 2 and described above is merely exemplary. The data structure of the fact repository 124 may take on other forms. Other fields may be included in facts and some of the fields described above may be omitted. Additionally, each object may have additional special facts aside from name facts and property facts, such as facts conveying a type or category (for example, person, place, movie, actor, etc.) for categorizing the entity or concept represented by the object. In some embodiments, an object's name(s) and/or properties are represented by special records that have a different format than the facts records 204 associated with the attribute-value pairs of an object.

Figure 3:
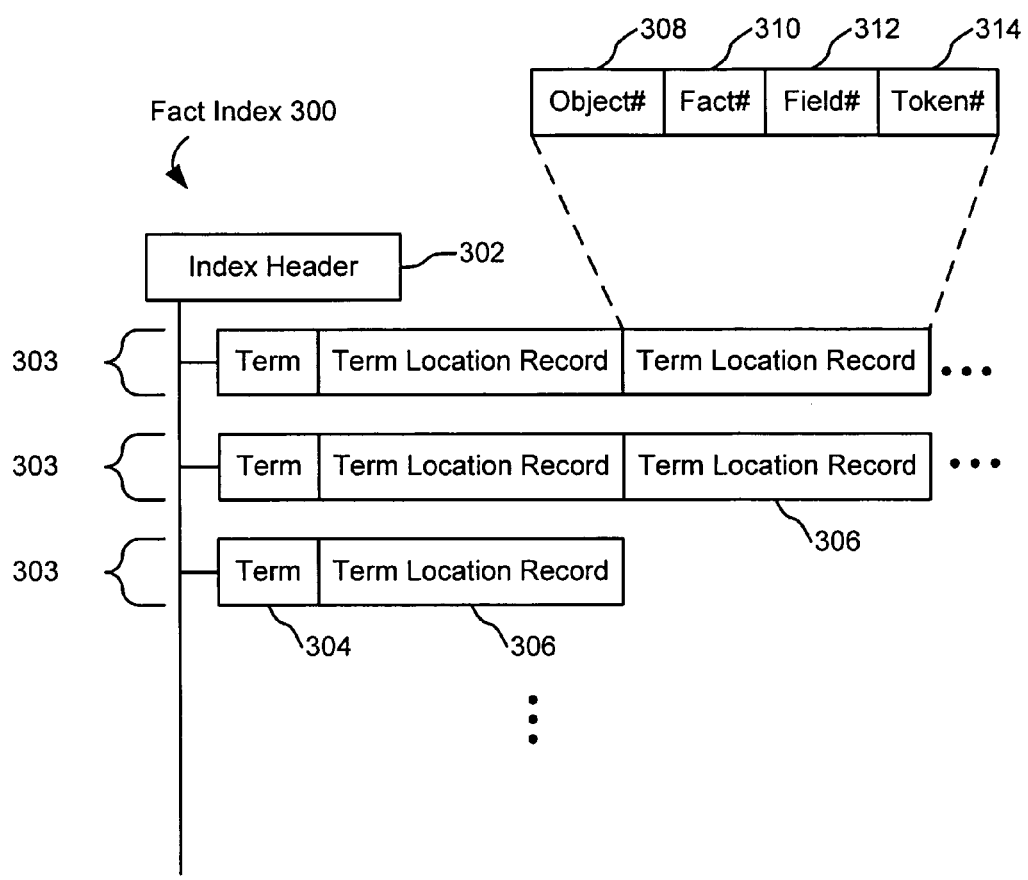
FIG. 3 illustrates a data structure for a fact index, according to some embodiments of the invention.

FIG. 3 illustrates an exemplary fact index, according to some embodiments of the invention. As described above, the fact index 122 may index the fact repository based on one or more parameters. In some embodiments, fact index 300 may be that index. The fact index 300 maps unique terms to facts, or to locations of information within the fact repository 124. As used herein, a term is a word (such as "Spain" or "George") or number (such as "123" or "−9"). In some embodiments, terms may also include terms that contain two or more words, such as "United States" or "birth date." The fact index 300 includes multiple sets 303 of terms and associated term location records, and may optionally include an index header 302 with information about the index 300 (e.g., information about the size of the index, information about a mapping function used to locate the sets, etc.). Within each set 303 is a term 304 and one or more term location records 306 that identify the locations of each appearance of the term within the fact repository 124. Each term location record has an object identifier 308 (identifying the object where the term appears), a fact identifier 310 (identifying the fact within the object), a fact field identifier 312 (identifying the field within the fact), and a token identifier 314 (identifying the token within the field). These four fields map a term to a location in the fact repository 124. However, it should be appreciated that the fact index 300 is merely exemplary and other forms of the fact index 300 and other fact indexes are possible.

Figure 4:
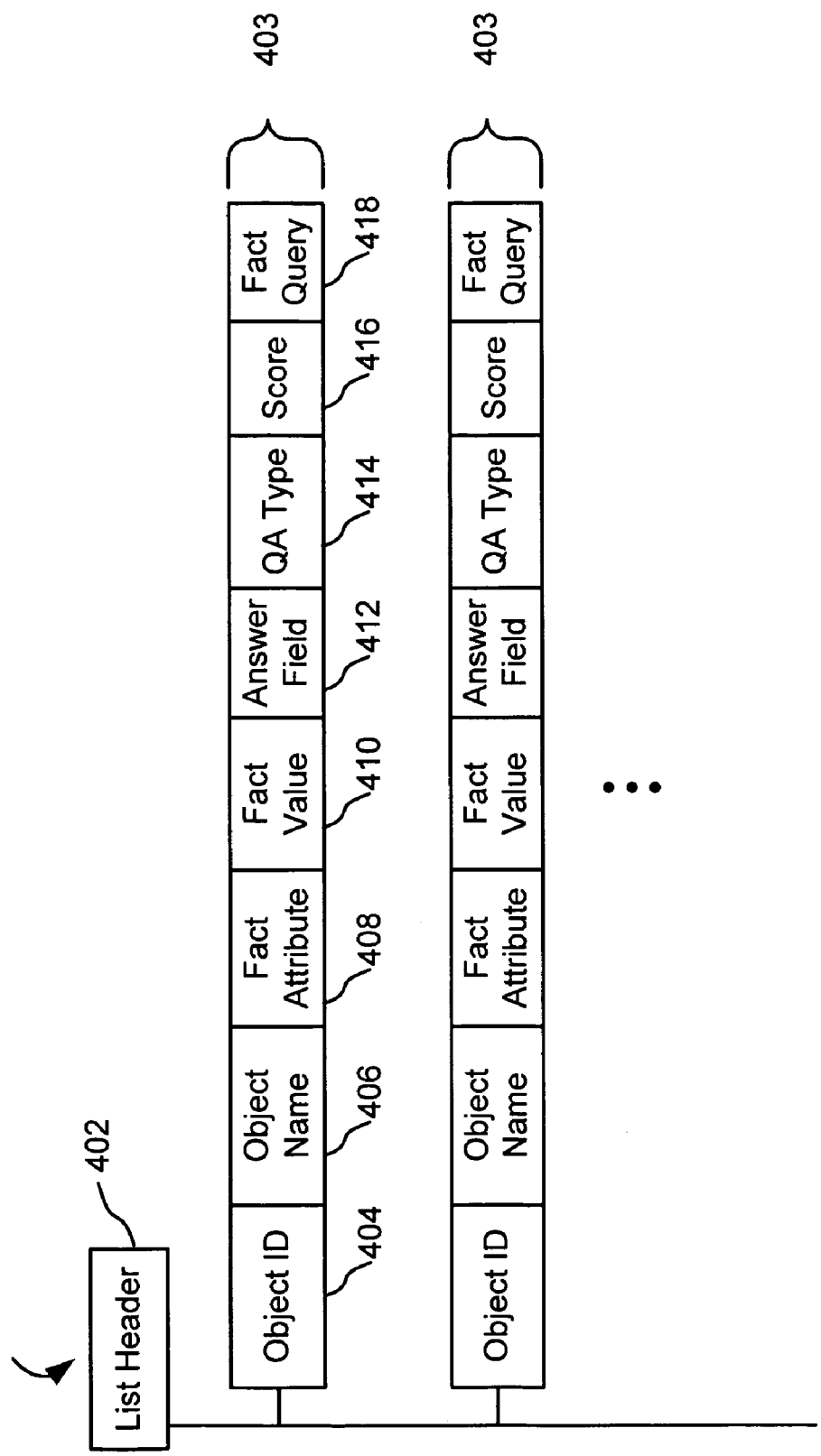
FIG. 4 illustrates a data structure for a list of possible answers, according to some embodiments of the invention.

FIG. 4 illustrates an exemplary list of possible answers to a factual query, according to some embodiments of the invention. The second search controller 118 receives a list of one or more possible answers to a factual query from the second cache 120, or from a search of the fact repository 124, selects the best answer from the list of possible answers, and transmits the best answer to the query server 108 for further processing, further details of which are described below, in relation to FIGS. 5A-5C. FIG. 4 illustrates an exemplary list of possible answers 400. The list 400 includes one or more possible answers 403. Each possible answer 403 has one or more fields. The object ID 404 identifies the object which included the fact that is a possible answer. The object name 406 identifies the name of the entity or concept represented by the object identified by the object ID 404. The object name 406 may be the value of a name fact included in the object (see above discussion of object data structure). The fact attribute 408 identifies the attribute of the fact that is a possible answer. The fact value 410 identifies the value of the fact that is a possible answer. The answer field 412 identifies which of three fields—object name 406, fact attribute 408, or fact value 410—has the actual answer that is responsive to the factual query (that is, the kind of answer the user is looking for). The QA type 414 identifies the type of question that is posed by the factual query (that is, the kind of question the user is asking and, by implication, the answer that is responsive to the kind of question being asked). The score 416 indicates a score for the possible answer. The score is a metric that attempts to measure the quality of the possible answer as an accurate and responsive answer. The fact query 418 is the internal query generated by the second search controller 118 that led to the identification of the possible answer as such. The fact query 418 is generated based on the user query (that is, the query as entered by the user at client 102). Further details about the QA type 414, the score 416, and the fact query 418 are described below, in relation to FIGS. 5A-5C. In some embodiments, possible answers 403 may be represented by more or fewer fields of information. In some embodiments, the list 400 includes a list header 402 that contains information applicable to the entire list 400. For instance, the header 402 may include a copy of the user query, a pointer to the top entry of the list 400, or other data structures for facilitating access to the items or records in the list 400.

Figure 5A:
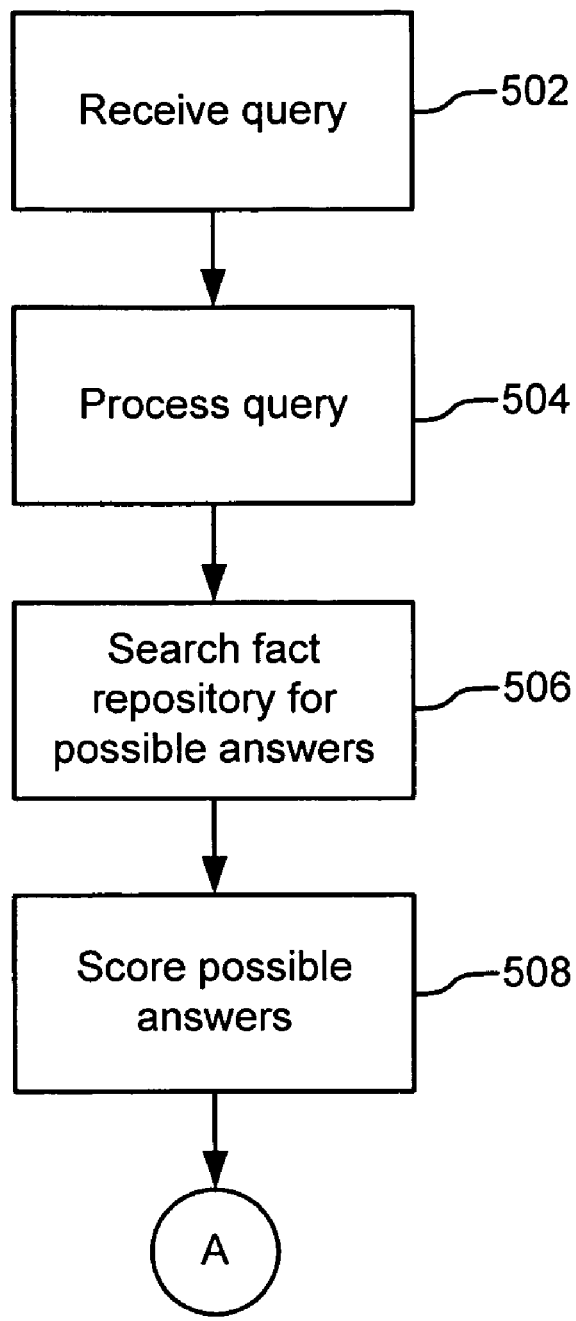
FIGS. 5A-5C are flow diagrams of a process for selecting an answer to a factual query and displaying the answer and sources of the answer, according to some embodiments of the invention.
Figure 5B:
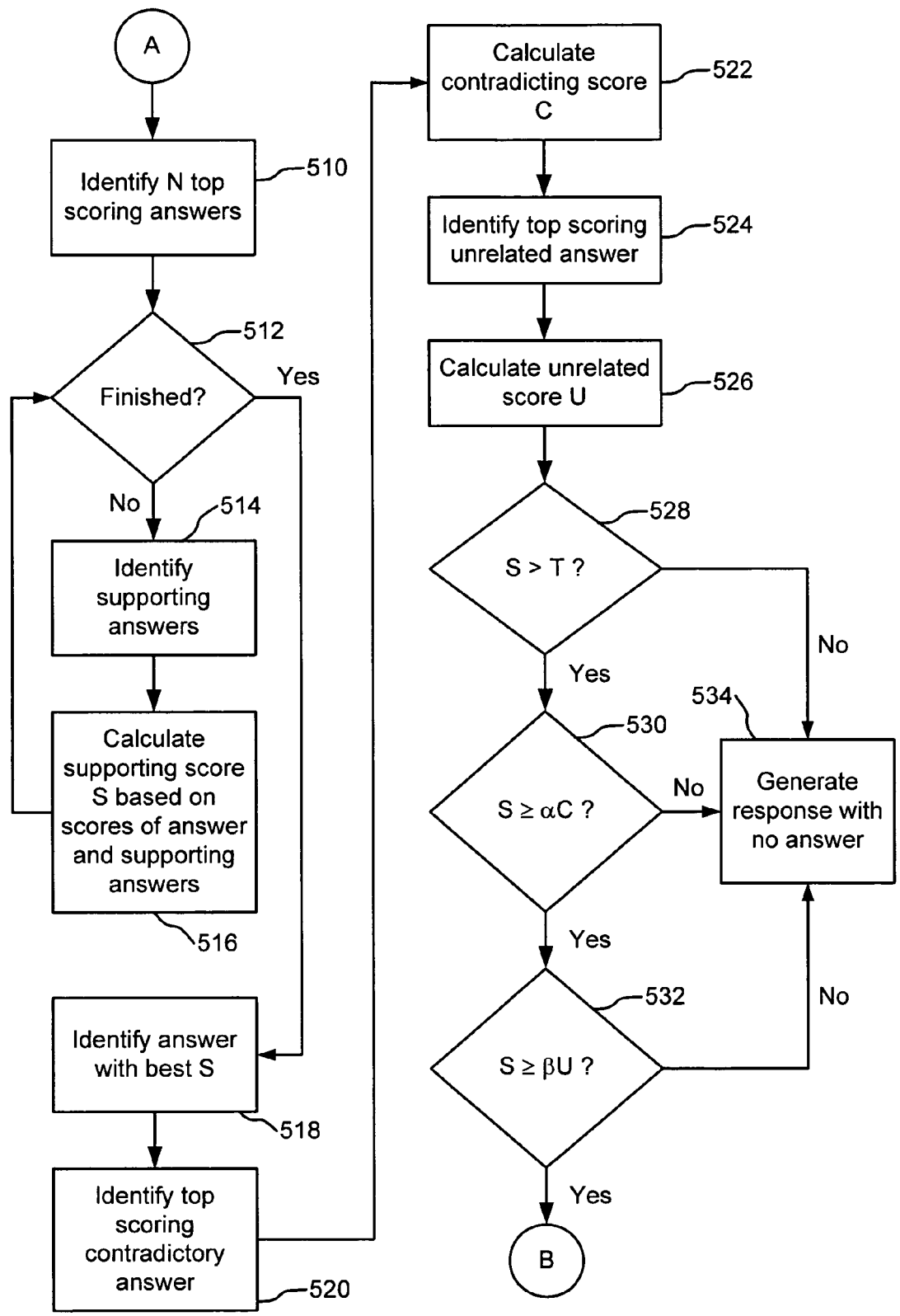
Figure 5C:
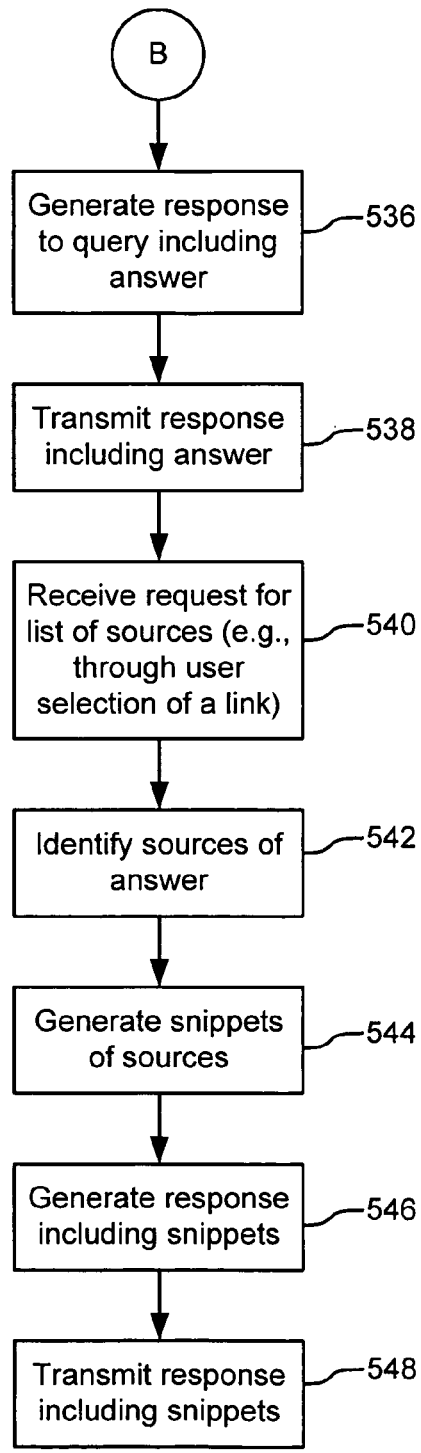

FIGS. 5A-5C illustrates an exemplary process for selecting a best answer to a factual query and presenting that answer according to some embodiments of the invention. The answer to a factual query is the fact in the fact repository 124 that is identified as the best response to the factual query. Upon receiving a factual query, the query engine 106 processes the query, identifies possible answers, selects the best answer, and generates a response that includes the answer. The query engine 106 may also generate a response that includes a list of sources of the answer.

A query is received by the query engine 106 (502). The query was entered at the client 102 by the user and transmitted by the client 102 to the query engine 106. The query includes one or more terms. The query as entered by the user is the user query.

The user query is processed (504). The user query is transmitted to both the first search controller 110 and the second search controller 118. Because the user query may also be treated as a search query for documents, such as a Web search, it may be transmitted to system components that handle such searches, such as the first search controller 110. Searches for documents, such as Web searches, are well known in the art and need not be further described.

The user query is also transmitted to the second search controller 118. In some embodiments, the user query, after conversion to a canonical form (e.g., conversion to all lowercase and removal of extraneous whitespaces), may be used to access the second cache 120 for possible answers that are pre-scored (e.g., from a previous processing of the same query). If found, those answers are returned immediately.

The user query is also parsed by a set of parsers and one or more question frames may be generated based on the parsing. A question frame represents a possible interpretation of the user query. A question frame includes a sequence of phrases or terms, with each phrase or term optionally constrained to match only a particular field. The question frame may also include weights associated with each of one or more QA types, the weights indicating which QA types the question frame favors. A weight may be a positive number from a predefined range, such as between 0 to 1, inclusive. The question frame(s) are used to generate one or more fact queries. The process of generating fact queries may include dropping (or making optional) "stopwords" (such as definite and indefinite articles and prepositions) and expanding words and/or phrases within the user query to include their respective synonyms or equivalents. For example, a phrase "birth date" may be expanded to include its synonyms "date of birth" and "birthday." The fact query is a query internal to the query engine 106 and used to access the second cache 120, and the fact repository 124 (via the fact index 122) for possible answers. Each of these fact queries may be used to access the fact repository 124 and the fact index 122 for possible answers.

A user query may conceptually fit into one or more QA types. A QA type is a question-to-answer mapping that indicates what factual question is being asked by the user query and the kind of answer that is responsive to factual query. In some embodiments, there are three general QA types: name and attribute to value ("NA-V"); attribute and value, or property, to name ("AV-N"), and name to property, type, or name ("N-PTN"). In some embodiments, there may be additional specialized QA types to handle specific types of questions. In some embodiments, these specialized QA types may be specialized instances of the general QA types.

In the NA-V type, the user (by entry of a user query) provides an object name and an attribute and wants to know the value of the corresponding attribute for the object with the given name. An example of a NA-V type query may be "what is the capital of Poland," in which "Poland" is the object name and "capital" is the attribute of "Poland" for which the value is desired. The answer for this query would be the value of a fact, associated with the object with the name "Poland," and having the attribute "capital." In this case, the value of the fact with the "capital" attribute may be the string "Warsaw." The value may also be the object identifier for an object with name "Warsaw," in which case the name "Warsaw" may be substituted for the object identifier and returned as a possible answer.

In the AV-N type, the user provides an attribute and a value (or a property, since properties are merely specialized attribute-value pairs, as described above) and wants a name that has the given value for the given attribute. In a sense, this is a "reverse lookup." An example of an AV-N type query may be "which country has Warsaw as its capital," in which case "capital" is the attribute and "Warsaw" is the value. A possible answer may be the name of the object with this attribute-value pair, namely "Poland."

In the N-PTN type, the user provides a name and wants a property or type or alternate name of the object associated with the given name. One example of the N-PTN type query may be "what is the NRA." "NRA" is the name of the object for which the user wants a property, type or alternate name. One possible property answer for "NRA" is "a Second Amendment rights advocacy group." A type answer, which conveys a categorization of the entity or concept represented by an object, for "NRA" may be "organization," indicating that the NRA is an organization, as opposed to other types such as a person, book, movie, etc. An alternate name for "NRA" may be "National Rifle Association," which is the official name of the entity represented by the object with an (acronym) name "NRA."

In some embodiments, the fact query may include additional constraints. For example, the fact query may specify that a certain term may only match in a particular field and not other fields. Another constraint may be that any possible answer must match a specific type (such as person, book, etc.). Such constraints may be generated based on constraints included in the question frame.

After the user query is processed and one or more fact queries are generated, the fact queries are used to access the fact repository 124 (via the fact index 122) (506). The possible answers are the facts that match the fact query or queries, and/or match the user query. The possible answers are scored (508). The score for a possible answer provides an indication of the quality of the possible answer as an accurate and responsive answer.

In some embodiments, the score of a possible answer is a multiplicative product of a plurality of factor values. In some embodiments, one or more of the factor values may be normalized values between 0 and 1, inclusive. In some embodiments, there is a answer scorer corresponding to each QA type, that scores possible answers for that particular QA type. A scorer may be disabled for a particular possible answer if the QA type weight is 0 for the question frame (for a particular fact query) that led to the identification of the possible answer, because the weight is part of the multiplicative product that makes up the score and a weight of 0 yields a score of 0. The factors utilized by the answer scorer for each QA type may vary from one QA type to another. In some embodiments, because the score, being the product of factors that are between 0 and 1, inclusive, can remain the same or decrease towards 0 but never increase, the scoring for any particular possible answer may be aborted if the score for that particular answer decreases below a predefined threshold. This may be an indication that the possible answer is of such poor quality that further scoring would be wasteful.

In some embodiments, the factors may be based on the QA type weight, metrics of the fact that matched the fact query (such as a confidence metric and an importance metric), the agent that extracted the matching fact, the degree to which a field in the fact was matched by the fact query, the degree to which particular fields in the fact match the fact query completely, and so forth. It should be appreciated that the factors described above are merely exemplary and that other factors may be included in addition to the ones described above and some of the factors described above may be omitted.

After each possible answer is scored, the possible answers are gathered into a possible answer list, such as the possible answers list 400 described above, in relation to FIG. 4. In some embodiments, only a predefined number of top scoring answers are gathered into the possible answers list 400. For example, the possible answers list may include only the 100 highest scoring possible answers. In some embodiments, further processing of the possible answers list 400 is handled by the second search controller 118.

Continuing in FIG. 5B, a number of the highest scoring possible answers are identified from the possible answers list 400 (510). The number may be a predefined number that specifies how many top scoring answers will be further processed. As long as there are still identified top scoring possible answers to be processed (512—no), a next top scoring answer is processed. The processing involves identifying supporting answers for the respective top scoring answer (514) and determining a supported score for the respective top scoring answer based on the score of the respective top scoring answer and the scores of its supporting answers (516). The identification of supporting answers is discussed in more detail below.

In some embodiments, the supported score is determined by converting each of the scores of the top scoring answer and its supporting answers to odds space values. A score s is converted to an odds space value x.

$$x = \left(\frac{s}{1-s}\right)$$

The converted values (i.e., the odds space conversions of the scores) are summed to generate to a value X, and that sum X is converted back to a probability space value to get the supported score S for the top scoring answer.

$$S = \left(\frac{X}{1+X}\right)$$

After the supported scores are determined for the identified top scoring answers (512—yes), the top scoring answer with the highest supported score (hereinafter "best supported answer") is identified (518). For the best supported answer, the top scoring answer within the list of possible answers that is contradictory to the best supported answer is identified (520). For that contradictory answer, a contradicting score C, which is the supported score for that contradictory answer, is determined (522). In addition, in some embodiments, the top scoring answer within the list of possible answers that is unrelated to the best supported answer is identified (524). For that unrelated answer, a unrelated score U, which is the supported score for that unrelated answer, is determined (526). It should be appreciated that the process for determining contradicting score C and unrelated score U are similar to the process for determining S: supporting answers are identified, the scores are converted to odds space values, the odds space values are summed, and the sum is converted back to a probability space value. The determination of contradictory and unrelated answers are described below.

Whether two possible answers are supporting, contradictory, or unrelated are based on comparisons of the fields of the two answers. Each answer's fields of interest, namely the name, attribute, and value, are grouped into an input and output. For example, in some embodiments, for a NA-V type query, the inputs are the name and the attribute and the output is the value. For an AV-N type query, the inputs are the attribute and the value and the output is the name. Two possible answers are compared by doing pair-wise comparisons of their input fields and their output fields. The comparison takes into account the type of data in the fields, that is, whether the data in the field is a string of words, a date, a number, and so forth. The source of the answer may also be considered.

In some embodiments, the result of a pair-wise field comparison is one of five classifications. They are:
  not comparable: the fields have different data types (for example, strings of words vs. a date) and thus cannot be compared;
  not similar: the fields are of the same data type, but are not the same at all;
  somewhat similar: the fields have some similarity, but it is difficult to conclude if they may mean the same thing;
  very similar: the fields are nearly the same; and
  identical: the fields are exactly the same.

The actual determination of whether the fields are the same or not may differ by data type. For example, for numbers, if the numbers are small integers, then they must be exactly equal in order to be treated as the same. If the numbers are very large integers or floating point numbers, then they may be treated the same if they are within a certain percentage of each other.

Based on the pairwise field comparisons, the relationship between the two answers are classified:

- Two answers are classified as "complementary" if the answers came from the same source. Answers that are complementary to an answer A are ignored;
- Two answers are classified as "may support" (i.e., an answer A "may support" an answer B), if the answers have the identical or very similar inputs but the outputs are only somewhat similar. An answer A that "may support" an answer B is also ignored;
- Two answers are classified as "supporting" if the answers have identical or very similar inputs and identical or very similar outputs, unless the two answers came from the same source. The scores of "supporting" answers are part of the determination of the supported score;
- Two answers are "contradictory" if the inputs are identical or very similar but the outputs are not similar or are not comparable; and
- two answers are "unrelated" if the inputs are not similar or are not comparable.

The supported score S of the best supported answer is compared to a predefined threshold T (528). The threshold T is a minimum score that the supported score S must reach if the best supported answer is to be considered further. If S is less than or equal to T (528—no), then the processor(s) performing the processing shown in FIG. 5B (e.g., the second search controller 118 or the query engine 106) may generate a response indicating that the query engine 106 is unable to provide an answer (534). For example, the second search controller 118 may transmit a response to the query server 108 indicating that an answer is unavailable, and the query server 108 may generate and transmit a response to that effect to the client 102 for presentation to the user.

If S is greater than T (528—yes), then a check is made to see whether the supported score S of the best supported answer exceeds the best supported score C of a contracting answer by at least a first predefined margin. In one embodiment, this check is made by comparing S to the contradicting score C multiplied by a constant α (530). The constant α represents the minimum S to C ratio that must be achieved in order for the best supported answer to be selected as the best answer to the factual query. In other words, S has to be at least α times the contradicting score C. If S is less than αC (530—no), then the processor(s) performing the processing shown in FIG. 5B (e.g., the second search controller 118 or the query engine 106) may generate a response indicating that the query engine 106 is unable to provide an answer (534).

If S is equal to or greater than αC (530—yes), then another a check is made to see whether the supported score S of the best supported answer exceeds the best supported score U of an unrelated answer by at least a second predefined margin. In one embodiment, this check is made by comparing to the unrelated score U multiplied by a constant β (532). The constant β represents the minimum S to U ratio that must be achieve before the best supported answer may be selected as the best answer to the factual query. In other words, S has to be at least β times the unrelated score U. If S is less than βU (532—no), then the processor(s) performing the processing shown in FIG. 5B (e.g., the second search controller 118 or the query engine 106) may generate a response indicating that the query engine 106 is unable to provide an answer (534). If S is equal to or greater than βU (532—yes), then the best supported answer is selected as the answer to the factual query and further processed, further details of which are described below in relation to FIG. 5C.

The comparison of S to T, αC, and βU represents, in some embodiments, a three-part test for determining if the best supported answer is the best answer to present to the user. In some other embodiments, the test may utilize sigmoid functions.

$$y(x, k, s) = \frac{1}{1 + \left(\frac{k}{x}\right)^s}$$

The test involves determining the multiplicative product of $y(S, k_1, s_1)$, $y(C, k_2, s_2)$, and $y(U, k_3, s_3)$, i.e., $P=y(S, k_1, s_1)*y(C, k_2, s_2)*y(U, k_3, s_3)$, where $k_1, s_1, k_2, s_2, k_3$, and $s_3$ are predefined constants. If P is greater than a predefined threshold γ, then the best supported answer is selected as the answer and processed further.

Continuing in FIG. 5C, after the best supported answer is selected as the best answer to the factual query, the query server 108 generates a response (536). The response may include the best supported answer. The response may include an identifier and/or a hyperlink (e.g., to a URL), for a source of the best supported answer. In some embodiments, the response may also include a link that, when clicked upon by a user at client 102, can generate a request for a list of the sources of the best supported answer. In some embodiments, the response may also include the results of a document search, such as a Web search, based on the user query. The document search results may be transmitted to the query server 108 from components of the query engine 106 that handle such searches, such as the first search controller 110. The response is transmitted to the client 102 for presentation to the user (538). An exemplary response including the answer and results of a document search using the user query is described in further detail below, in relation to FIG. 6.

The user, seeing the presented response at the client 102, may request a listing of the sources of the answer. In some embodiments, the user may make that request by clicking on a link included in the response (as described above) that generates the request for the sources listing upon being clicked.

The query engine 106 receives the request to list the sources of the answer (540). The sources of the answer are identified (542). In some embodiments, the sources of the answer may be identified by looking up the sources 220 (FIG. 2) of the answer fact in the fact repository 124. A snippet generation request is sent to the first search controller, along with the list of sources, the user query, the fact query 418 that matched the answer, and the answer. The snippet generation request is submitted to the first cache 112 and/or the document database 116. In some embodiments, if the list of sources is longer than a predefined limit, a subset of the list of sources may be selected by the first search controller 110 and submitted to the first cache 112 and/or the document database 116 for snippet retrieval or generation. The first cache 112 and/or the document database 116, or one or more processors to which the snippet generation request is submitted, generates a snippet for each of the listed sources (544). Each snippet may include one contiguous portion of text or a plurality of non-contiguous portions of text from the respective source. For a particular snippet, if the text portions chosen for inclusion in the snippet are not contiguous within the source, the portions may be separated by ellipses.

Each snippet is generated such that it includes as many terms of the user query and/or the fact query and as many terms of the answer as possible. The source may be analyzed for the scatter of query and answer terms (that is, how scattered the query terms and answer terms are in the source document) to assist in the generation of the snippet. The text portion or portions that yield the least query term and answer term scatter are selected for inclusion in the snippet.

A response that includes the snippets is generated (546). The response includes a list of sources and snippets of each source that includes the user/fact query terms and answer terms. The response may also include the answer, the user query, and hyperlinks to each source. The response is transmitted to the client 102 for presentation to the user (548).

In some embodiments, the user/fact query terms and answer terms in each snippet are highlighted to make them more prominent when the response is presented to the user. As used herein, highlighting of terms within the snippets refers to any manner of making the terms more prominent when presented to the user including, but not limited to, making the terms bold, underlining the terms, italicizing the terms, changing the font color of the terms, and/or adding background color to the local area of the terms. An exemplary response that includes the list of sources and the snippets is described in further detail below, in relation to FIG. 7.

In some embodiments, queries submitted to the query engine 106 may be represented by a URL that includes the user query terms and one or more other parameters. For example, a query for the terms "britney spears parents" may be represented by the URL "http://www.google.com/search?hl=en&q=britney+spears+parents". In some embodiments, a request to display a list of sources for the answer may be made by adding an additional parameter, such as "&fsrc=1" to the query URL. Thus, for the above URL, if the sources list for the answer to the query "britney spears parents" is desired, the query URL may look like "http://www.google.com/search?hl=en&q=britney+spears+parents&fsrc=1". In some embodiments, the link in the response including the answer, that triggers a request for the sources list of the answer when clicked on by the user, is the query URL for the user query with the addition of the additional parameter.

In some embodiments, the query engine 106 may accept, along with a factual query, a predefined special operator that instructs the query engine 106 to find an answer to the factual query and return the answer and a list of sources of the answer, without first returning a list of documents found using the query as input to a document search. For example, a user may enter "Z:X of Y," with "Z:" being the special operator, to instruct the query engine 106 to find answers to the factual query "X of Y" and list the sources of the answer. In a sense, use of the operator along with the query merges the query with a request for a list of sources of whatever answer or answers may be found for the query. In some embodiments, the link in a response that generates a request to list the sources of the answer, as described above, adds the special operator to the original query and submits the query with the special operator to the query engine 106 when that link is selected (e.g., clicked) by the user.

Figure 6:
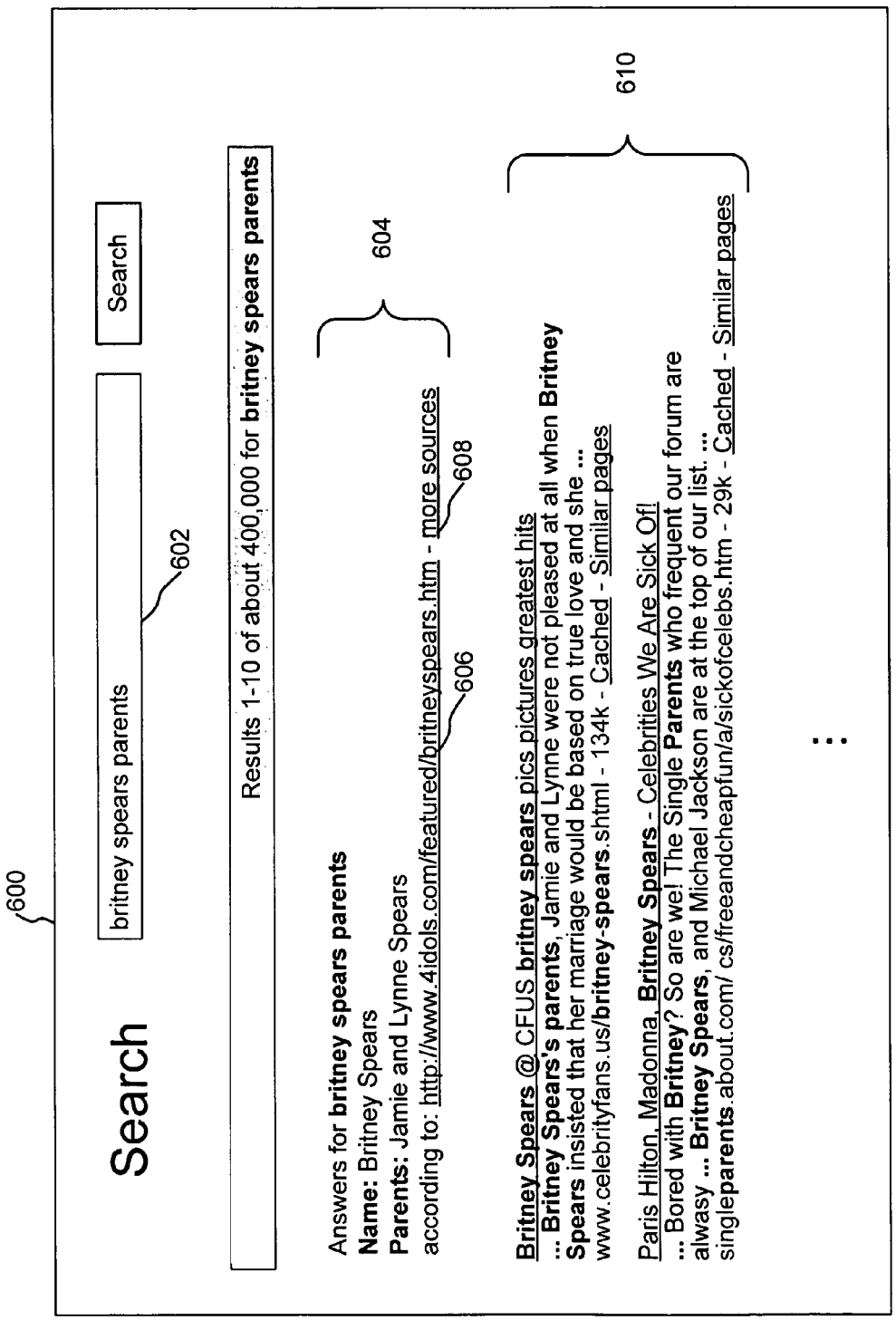
FIG. 6 illustrates a presentation of an answer to a factual query, according to some embodiments of the invention.

FIG. 6 illustrates an exemplary response, as presented to the user at client 102, to a factual query that includes the answer and results of a document search using the factual query as input, according to some embodiments of the invention. The response 600 may show a search box 602 with the original user query. The response 600 includes the answer for the query 604, a hyperlink to a source of the answer 606, and a link 608 that, when clicked upon by the user, triggers a request for a list of sources for the answer. In some embodiments, the link 608 may be the query URL for the user query with the addition of the source list request parameter, as described above. In some embodiments, the link that, when clicked on by the user, triggers a request for a list of sources for the answer may be omitted in the response 600 if the answer fact 604 has only one source in the fact repository 124. The response may also include a list of results 610 of a document search, such as a Web search, using the factual query as input.

Figure 7:
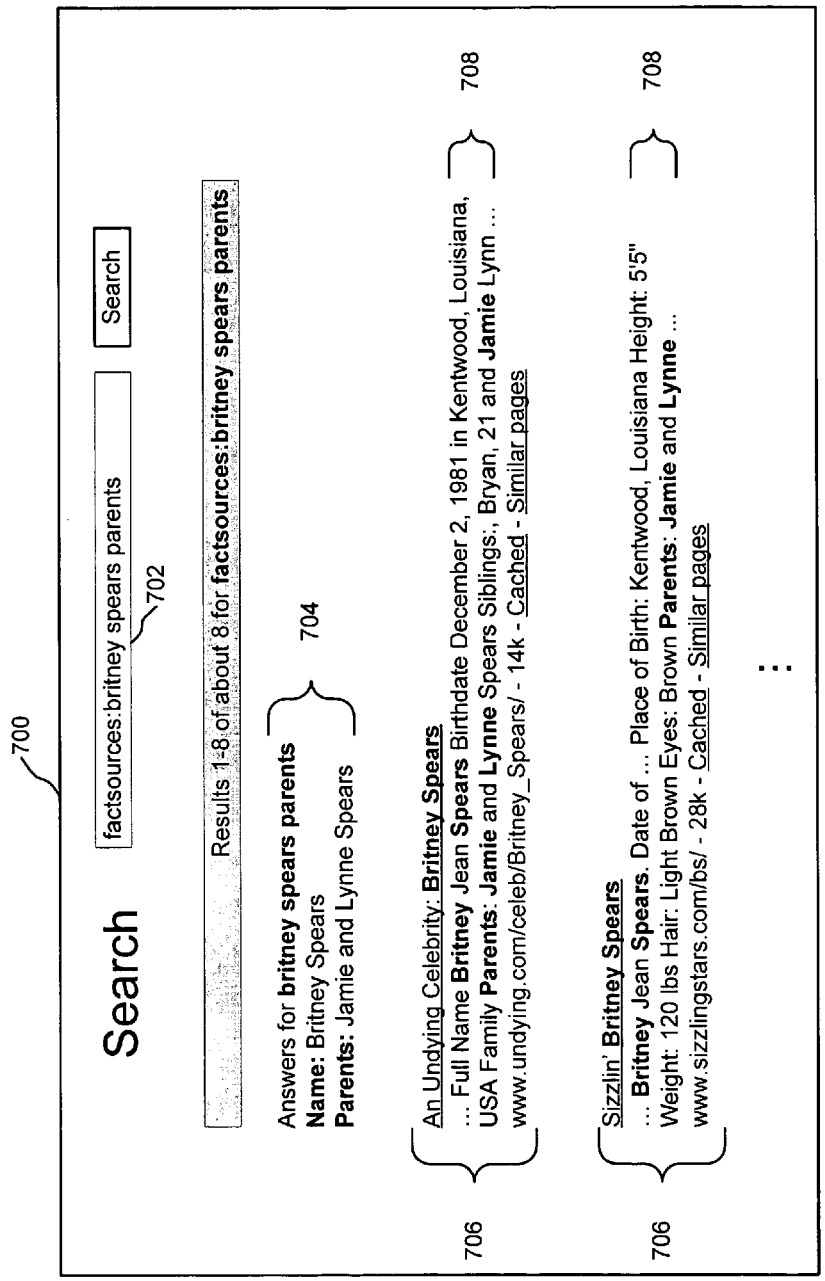
FIG. 7 illustrates a presentation of a list of sources of an answer to a factual query, according to some embodiments of the invention.

FIG. 7 illustrates an exemplary response to a request for a list of sources of an answer, according to some embodiments of the invention. The response 700 may include a search box 702 with the original user query. In some embodiments, the search box 702 may also include the special operator, as described above, which may be used along with a factual query to requests a list of sources. For example, in search box 702, "factsources:" is the special operator and "britney spears parents" is the original user query. In some other embodiments, the operator may be omitted from the presentation of the query in the search box if, for example, the trigger of the request for a list of sources is the user clicking on a link, such as the link 608, that includes the query URL with the source list request parameter. The response may also include the answer 704 to the fact query, and a list of one or more sources 706 for the answer, along with URL's, hyperlinks, and snippets 708 for each source. In some embodiments, within each snippet 708, the query terms and answer terms may be highlighted. In the snippets 708, the query terms and answer terms are highlighted by making them bold.

Figure 8:
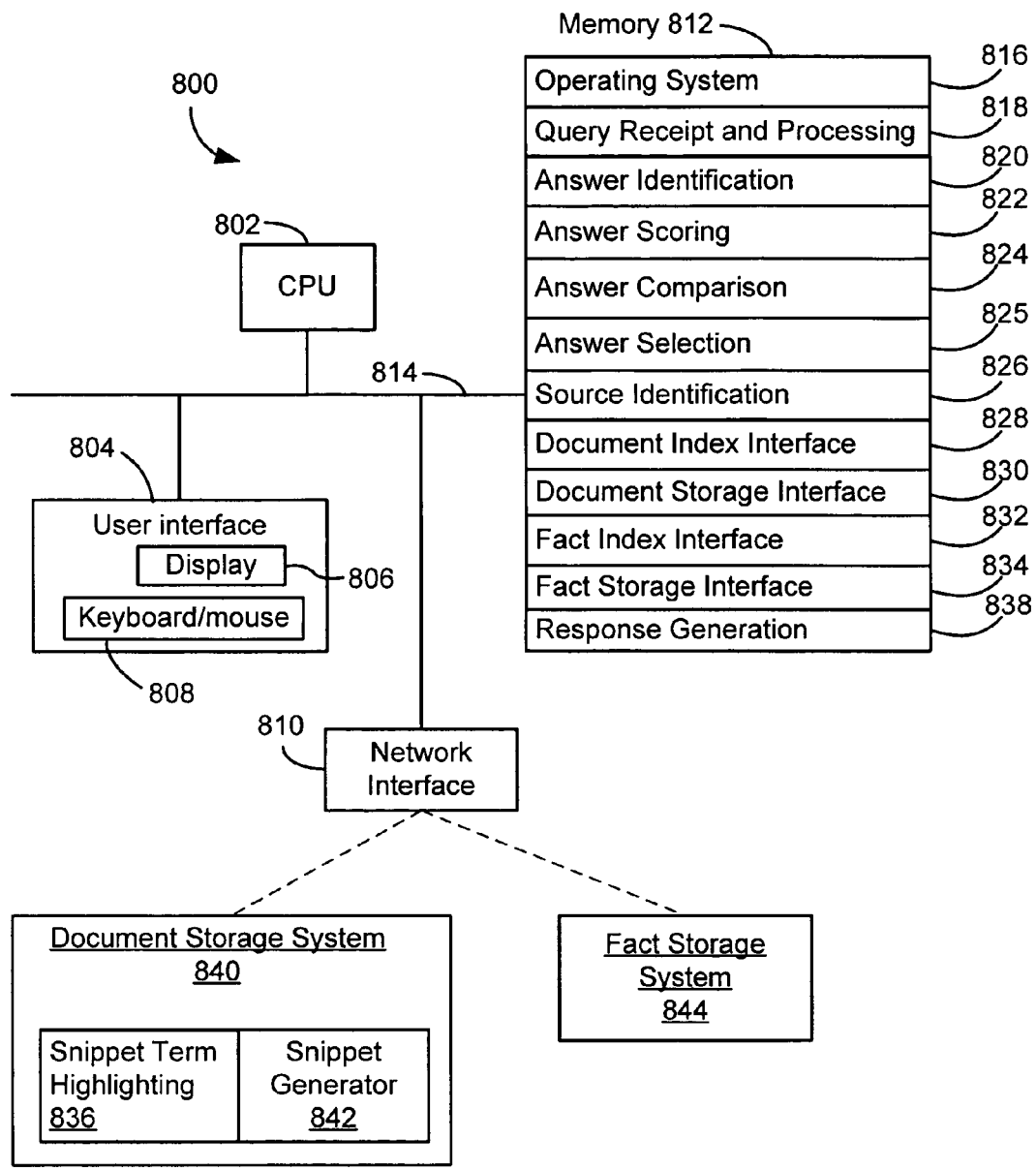
FIG. 8 illustrates a system for selecting an answer to a factual query and displaying the answer and a list of sources of the answer, according to some embodiments of the invention.

FIG. 8 is a block diagram illustrating a factual query answering system 800, according to some embodiments of the invention. The system 800 typically includes one or more processing units (CPU's) 802, one or more network or other communications interfaces 810, memory 812, and one or more communication buses 814 for interconnecting these components. The system 800 optionally may include a user interface 804 comprising a display device 806 and a keyboard/mouse 808. The memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 812 may optionally include one or more storage devices remotely located from the CPU(s) 802. In some embodiments, the memory 812 stores the following programs, modules and data structures, or a subset thereof:

- an operating system 816 that includes procedures for handling various basic system services and for performing hardware dependent tasks;
- a query receipt and processing module 818 for receiving queries and processing queries, such as parsing the queries to determine the QA type and generating fact queries;
- an answer identification module 820 for identifying possible answers to factual queries;
- an answer scoring module 822 for determining scores and supported scores for answers;
- an answer comparison module 824 for comparing answers to determine if they are supporting, contradictory, and so forth;
- an answer selection module 825 for selecting a possible answer as the answer to present to the user;
- a source identification module 826 for identifying sources of an answer;
- a document index interface 828 for interfacing with a document index when searching for documents;

a document storage interface 830 for interfacing with a document storage system when requesting and receiving snippets;

a fact index interface 832 for interfacing with a fact index when searching for facts;

a fact storage interface 834 for interfacing with a fact storage system; and a response generation module 838 for generating responses to be transmitted to the client 102.

In some embodiments, memory 812 of system 800 includes the fact index instead of an interface 832 to the fact index. The system 800 also includes a document storage system 840 for storing contents of documents, some of which may be sources for answer facts. The document storage system includes a snippet generator 842 for accessing the contents of documents and generating snippets from the contents and a snippet term highlighting module 836 for highlighting query terms and answer terms within snippets. The system 800 also includes a fact storage system 844 for storing facts. Each fact stored in the fact storage system 844 includes a corresponding list of sources from which the respective fact was extracted.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 812 may store a subset of the modules and data structures identified above. Furthermore, memory 812 may store additional modules and data structures not described above.

Although FIG. 8 shows a factual query answering system, FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a factual query answering system and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for selecting an answer to a factual query, comprising:

receiving a factual query;

searching a fact repository to identify a set of possible factual answers to the factual query, wherein the fact repository stores factual information extracted from a plurality of documents;

determining respective scores for at least a subset of the possible factual answers;

identifying a first answer of the subset of the set of possible factual answers to the factual query, the first answer having a best score;

identifying, as an answer that is contradictory to the first answer, a second answer of the subset, wherein the second answer is the best scoring answer that is contradictory to the first answer; and generating a response including the first answer only if the score of the first answer exceeds a predefined threshold and exceeds the score of the second answer by at least a first predefined margin.

2. The method of claim 1, further comprising generating the response including the first answer only if the score of the first answer further satisfies a condition with respect to the score of a third answer of the subset.

3. The method of claim 2, wherein:

the third answer is one of the subset and is unrelated to the first answer; and the condition is that the score of the first answer exceeds the score of the third answer by at least a second predefined margin.

4. The method of claim 1, wherein respective factual answers of the subset are associated with respective attributes and attribute-values in the fact repository; and identifying, as an answer that is contradictory to the first answer, a second answer of the subset includes identifying, as an answer that is contradictory to the first answer, the second answer of the subset in accordance with respective attributes and attribute-values associated with the first answer and the second answer.

5. The method of claim 1, wherein identifying, as an answer that is contradictory to the first answer, a second answer of the subset includes identifying, as an answer that is contradictory to the first answer, the second answer of the subset in accordance with a result of a pair-wise field comparison of the first answer and the second answer.

6. A computer-implemented method for selecting an answer to a factual query, comprising:

receiving a factual query;

identifying a set of possible factual answers to the factual query by searching a fact repository that stores factual information extracted from a plurality of documents;

determining for each of the possible factual answers a respective score;

identifying first answers of the set of possible factual answers to the factual query with best scores;

for each of the first answers:

identifying, as answers that support the respective first answer, second answers of the set of possible factual answers that are distinct from the respective first answer and support the respective first answer; and determining a supported score by mathematically combining the score of the respective first answer and the scores of the second answers;

identifying a third answer of the first answers with a best supported score; and generating a response including the third answer only if the best supported score satisfies a first condition, wherein the first condition includes the best supported score being above a predefined threshold.

7. The method of claim 6, further comprising:

identifying a fourth answer of the possible answers as an answer that is contradictory to the third answer; and determining a supported score for the fourth answer.

8. The method of claim 7, wherein the first condition further includes the best supported score exceeding the supported score of the fourth answer by at least a predefined margin.

9. The method of claim 7, wherein determining the supported score for the fourth answer includes:
identifying answers of the possible answers that support the fourth answer; and
determining the supported score for the fourth answer by mathematically combining the score of the fourth answer and the scores of the answers that support the fourth answer.

10. The method of claim 6, further comprising:
identifying a fifth answer of the possible answers that is unrelated to the third answer; and
determining a supported score for the fifth answer.

11. The method of claim 10, wherein the first condition further includes the best supported score exceeding the supported score of the fifth answer by at least a predefined margin.

12. The method of claim 10, wherein determining the supported score for the fifth answer includes:
identifying answers of the possible answers that support the fifth answer; and
determining the supported score for the fifth answer by mathematically combining the score of the fifth answer and the scores of the answers that support the fifth answer.

13. The method of claim 6, wherein respective factual answers of the set of possible factual answers are associated with respective attributes and attribute-values in the fact repository; and
identifying, as answers that support the respective first answer, second answers of the set of possible factual answers includes identifying, as answers that support the respective first answer, second answers of the set of possible factual answers that are distinct from the respective first answer and support the respective first answer in accordance with respective attributes and attribute-values associated with the first answer and respective answers of the second answers.

14. The method of claim 6, wherein identifying, as answers that support the respective first answer, second answers of the set of possible factual answers includes identifying, as answers that support the respective first answer, second answers of the set of possible factual answers that are distinct from the respective first answer and support the respective first answer in accordance with results of pair-wise field comparisons of the first answer and respective answers of the second answers.

15. A system for selecting an answer to a factual query, comprising:
one or more processors;
memory;
a fact repository to store factual information extracted from a plurality of documents;
a query receiver to receive a factual query;
a possible answer identifier to search the fact repository to identify a set of possible factual answers to the factual query;
an answer scorer to determine respective scores for at least a subset of the set of possible factual answers to the factual query;
a best answer identifier to identify a first answer of the subset, the first answer having a best score, and to identify, as an answer that is contradictory to the first answer, a second answer of the subset, wherein the second answer is the best scoring answer that is contradictory to the first answer; and
a response generator to generate a response including the first answer only if the score of the first answer satisfies a first condition, wherein the first condition includes the score of the first answer exceeding a predefined threshold and exceeding the score of the second answer by at least a first predefined margin.

16. The system of claim 15, the response generator to generate the response including the first answer only if the best score further satisfies a second condition with respect to the score of a third answer of the possible answers.

17. The system of claim 16, wherein:
the third answer is one of the possible answers and is unrelated to the first answer; and
the second condition includes a condition that the best score exceeds the score of the third answer by at least a second predefined margin.

18. The system of claim 15, wherein respective factual answers of the subset are associated with respective attributes and attribute-values in the fact repository; and
the best answer identifier is configured to identify, as an answer that is contradictory to the first answer, the second answer of the subset in accordance with respective attributes and attribute-values associated with the first answer and the second answer.

19. The system of claim 15, wherein the best answer identifier is configured to identify, as an answer that is contradictory to the first answer, the second answer of the subset in accordance with a result of a pair-wise field comparison of the first answer and the second answer.

20. A system for selecting an answer to a factual query, comprising:
one or more processors;
memory;
a query receiver to receive a factual query;
a possible answer identifier to identify a set of possible factual answers to the factual query by searching a fact repository that stores factual information extracted from a plurality of documents;
an answer scorer to determine for each of the possible factual answers a respective score;
a best answer identifier to identify first answers of the set of possible factual answers to the factual query with best scores;
an answer comparator to identify, for each of the first answers, as answers that support the respective first answer, second answers of the possible factual answers that support the respective first answer;
a supported scorer to determine for each of the first answers a supported score by mathematically combining the score of the respective first answer and the scores of the second answers;
an answer selector to identify a third answer of the first answers with a best supported score; and
a response generator to generate a response including the third answer if the best supported score satisfies a first condition, wherein the first condition includes the best supported score being above a predefined threshold.

21. The system of claim 20, wherein:
the answer comparator further includes instructions to identify a fourth answer of the possible answers as an answer that is contradictory to the third answer; and
the supported scorer further includes instructions to determine a supported score for the fourth answer.

22. The system of claim 21, wherein the first condition further includes the best supported score exceeding the supported score of the fourth answer by at least a predefined margin.

23. The system of claim 20, wherein:
the answer comparator further includes instructions to identify a fifth answer of the possible answers that is unrelated to the third answer; and
the supported scorer further includes instructions to determine a supported score for the fifth answer.

24. The system of claim 23, wherein the first condition includes the best supported score exceeding the supported score of the fifth answer by at least a predefined margin.

25. The system of claim 20, wherein respective factual answers of the subset are associated with respective attributes and attribute-values in the fact repository; and
the best answer identifier is configured to identify, as answers that support the respective first answer, second answers of the set of possible factual answers that are distinct from the respective first answer and support the respective first answer in accordance with respective attributes and attribute-values associated with the first answer and respective answers of the second answers.

26. The system of claim 20, wherein the best answer identifier is configured to identify, as answers that support the respective first answer, second answers of the set of possible factual answers that are distinct from the respective first answer and support the respective first answer in accordance with results of pair-wise field comparisons of the first answer and respective answers of the second answers.

27. A non-transitory computer readable storage medium storing one or more programs for execution by one or more processors of a computer system, the one or more programs comprising instructions for:
receiving a factual query;
searching a fact repository to identify a set of possible factual answers to the factual query, wherein the fact repository stores factual information extracted from a plurality of documents;
determining respective scores for at least a subset of the set of possible factual answers;
identifying a first answer of the subset of possible factual answers, the first answer having a best score;
identifying, as an answer that is contradictory to the first answer, a second answer of the subset, wherein the second answer is the best scoring answer that is contradictory to the first answer; and
generating a response including the first answer only if the score of the first answer exceeds a predefined threshold and exceeds the score of the second answer by at least a first predefined margin.

28. The computer readable storage medium of claim 27, wherein the one or more programs include instructions for generating the response including the first answer only if the score of the first answer further satisfies a condition with respect to the score of a third answer of the subset.

29. The computer readable storage medium of claim 28, wherein:
the third answer is one of the subset and is unrelated to the first answer; and
the condition is that the score of the first answer exceeds the score of the third answer by at least a second predefined margin.

30. The computer readable storage medium of claim 27, wherein respective factual answers of the subset are associated with respective attributes and attribute-values in the fact repository; and
the instructions for identifying, as an answer that is contradictory to the first answer, a second answer of the subset include instructions for identifying, as an answer that is contradictory to the first answer, the second answer of the subset in accordance with respective attributes and attribute-values associated with the first answer and the second answer.

31. The computer readable storage medium of claim 27, wherein the instructions for identifying, as an answer that is contradictory to the first answer, a second answer of the subset include instructions for identifying, as an answer that is contradictory to the first answer, the second answer of the subset in accordance with a result of a pair-wise field comparison of the first answer and the second answer.

32. A non-transitory computer readable storage medium storing one or more programs for execution by one or more processors of a computer system, the one or more programs comprising instructions for:
receiving a factual query;
identifying a set of possible factual answers to the factual query by searching a fact repository that stores factual information extracted from a plurality of documents;
determining for each of the possible factual answers a respective score;
identifying first answers of the set of possible factual answers to the factual query with best scores;
for each of the first answers:
identifying, as answers that support the respective first answer, second answers of the possible factual answers that support the respective first answer; and
determining a supported score by mathematically combining the score of the respective first answer and the scores of the second answers;
identifying a third answer of the first answers with a best supported score; and
generating a response including the third answer only if the best supported score exceeds a predefined threshold.

33. The computer readable storage medium of claim 32, wherein the one or more programs include instructions for:
identifying a fourth answer of the possible answers as an answer that is contradictory to the third answer; and
determining a supported score for the fourth answer.

34. The computer readable storage medium of claim 33, wherein the instructions for generating the response including the third answer include instructions for generating the response including the third answer only if the best supported score exceeds the supported score of the fourth answer by at least a predefined margin.

35. The computer readable storage medium of claim 32, wherein respective factual answers of the subset are associated with respective attributes and attribute-values in the fact repository; and
the instructions for identifying, as answers that support the respective first answer, second answers of the set of possible factual answers include instructions for identifying, as answers that support the respective first answer, second answers of the set of possible factual answers that are distinct from the respective first answer and support the respective first answer in accordance with respective attributes and attribute-values associated with the first answer and respective answers of the second answers.

36. The computer readable storage medium of claim 32, wherein the instructions for identifying, as answers that support the respective first answer, second answers of the set of possible factual answers include instructions for identifying, as answers that support the respective first answer, second answers of the set of possible factual answers that are distinct from the respective first answer and support the respective first answer in accordance with results of pair-wise field comparisons of the first answer and respective answers of the second answers.

* * * * *